United States Patent Office 3,202,491
Patented Aug. 24, 1965

3,202,491
HYDROCARBON OIL SLUDGING INHIBITOR COMPOSITION
Donald A. Maxwell and William M. Gearhart, Kingsport, Tenn., assignors to Eastman Kodak Company, Rochester, N.Y., a corporation of New Jersey
No Drawing. Filed May 24, 1962, Ser. No. 197,265
12 Claims. (Cl. 44—63)

This invention relates to hydrocarbon oils.

Hydrocarbon oils in general and particularly hydrocarbon oils obtained by thermal and catalytic cracking processes, especially fuel oils such as various grades of furnace oils, diesel oils, kerosene and the like, are prone, particularly in the presence of copper, a metal present in many fuel oil systems, to form a polymeric material which, under normal storage conditions, precipitates and forms a sludge. This effect is termed sludging. When the hydrocarbon oils are put to use, this sludge plugs oil lines, burner jets, pumps and filter screens. One problem to which this invention provides a solution is how to inhibit, suppress or retard sludging of hydrocarbon oils.

Hydrocarbon oils in general are also prone to color formation under normal storage conditions. This is objectionable. Consequently, another problem to which this invention provides a solution is how to inhibit, suppress or retard color formation in hydrocarbon oils.

This invention is based upon the discovery that a novel mixture consisting essentially of (1) a particular reaction product, hereinafter referred to as an imide-amide reaction product, and (2), at a minor concentration relative to the imide-amide reaction product, a hydrogenated condensation product of a long chain aliphatic amine and a reducing sugar, has the effect, when incorporated into hydrocarbon oils, of suppressing sludging and discoloration thereof.

In summary, this invention in one aspect comprises this novel mixture. In another aspect this invention comprises broadly a hydrocarbon oil containing this novel mixture as a hydrocarbon oil sludging and discoloration inhibitor or antisludging composition.

The imide-amide reaction product is a product such as that obtained by reacting ethylenediamine tetraacetic acid, also know as ethylenedinitrilotetraacetic acid, hereinafter referred to as EDTA, with a $C_4$-$C_{24}$ primary aliphatic amine under reaction conditions selected to convert an average of at least about three fourths of the EDTA carboxyl groups to imide and amide groups. The product thus obtained consists essentially of imide-amide compounds, having on the average at most one amine salt group or one unreacted carboxyl group per molecule. These compounds include imide-monoamide compounds and triamide compounds as well as the tetraamide and di-imide compounds and the mixed imide-amide compounds such as imide-diamide compounds. The imide-amide compounds such as imide-diamide compounds. The imide-amide compounds are illustrated by the following formulae:

(I) 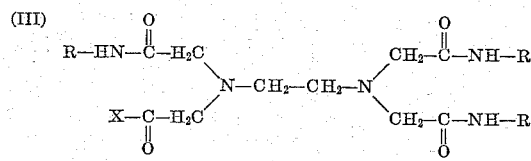

(II) 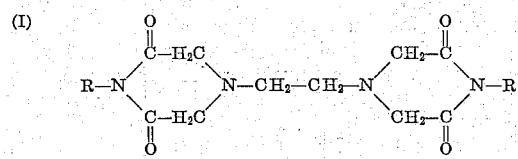

(III) 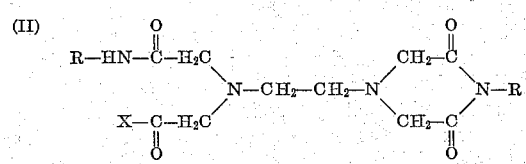

wherein R is an aliphatic radical of 4–24 carbon atoms and X is a member of the group of NH—R, OH·$RNH_2$ and OH radicals.

Amines suitable for reaction with EDTA to form the desired compounds are primary aliphatic amines having 4–24 carbon atoms per molecule. Especially preferred is a product marketed as Primene 81-R. This product is a mixture of branched chain, primary, alkyl amines with the amine groups being attached to tertiary carbon atoms and having 12–15 carbon atoms per molecule. The average molecular weight of this product is about 200. When this amine product is employed in the reaction with EDTA, compounds are formed in which R is a branched chain, alkyl group of 12–15 carbon atoms.

Another commercial mixture of amines suitable for making the desired imide-amide reaction product is a product available as Primene JM-T. This is essentially a mixture of branched chain, primary, alkyl amines of structure similar to the amines of Primene 81-R but containing 18–24 carbon atoms per molecule.

Typical examples of other suitable amines are 2-ethylhexylamine, octylamine, dodecylamine and the like. Other amines can also be used which form products in which R is an aliphatic group of 4–24 carbon atoms but not necessarily an aliphatic hydrocarbon group. Thus, a suitable class of amines includes the Duomeen products. One of such products, marketed as Duomeen 12, is a propylenediamine derivative having the structure:

$$H_2N-CH_2-CH_2-CH_2-NH-C_{12}H_{25}$$

This type of amine falls within the definition of primary amines employed in making the reaction product, the primary amino group being the reactive group of the molecule. In those compounds of the Formulae I, II and III prepared from this type of amine, the radical R is $(CH_2)_n$—NH—R', wherein $n$ is 2–3 and R' is an aliphatic hydrocarbon group of 8–18 carbon atoms.

The important reaction conditions are temperature, reaction time and mole ratio of amine to EDTA. These conditions are so selected that the desired imide-amide compounds are formed.

Of the reaction conditions employed in forming these reaction products, reaction temperature is particularly important. The temperature must be at least about 190° C. and preferably is in a range from about 190 to about 220° C.

Reaction time must be sufficient to enable the desired imide-amide compounds to be formed. When the reaction temperature is in a range from about 190 to about 220° C., the reaction time must be at least about one hour to yield these reaction products. In obtaining maximum substituted compounds, the reaction time is preferably about 6 hours, for example 6–8 hours.

Another important reaction condition is the mole ratio of amine to EDTA. The quantity of amine must be sufficient to convert at least 3 of the carboxyl groups of EDTA to the imide-amide groups. Therefore, the minimum mole ratio of amine to EDTA is about 2:1, which is the minimum stoichiometric ratio for producing such partially substituted compounds as the imide-monoamide or the diimide compounds. For producing the tetraamide the preferred upper limit is about 4:1. A higher mole ratio of amine to EDTA can be employed but an excess of amine, particularly at the lower reaction temperatures, can lead to production of undesired amine salts. In general, the amine to EDTA mole ratio should be at least about 2:1 and preferably in a range from about 2:1 to about 4:1.

A suitable procedure for making the desired reaction product comprises charging the EDTA in the liquid phase to a reaction vessel equipped with an agitator and heating means. The amine is then introduced into the vessel in an amount sufficient to provide the desired mole ratio of amine to EDTA, preferably in a range from about 2:1 to about 4:1. The mixture is heated at atmospheric pressure to a temperature in a range from about 190 to about 220° C. Heating is continued until the acid number (ASTM D974) is less than 60 or approximately that of the desired compounds, for example, zero in the case of the diimide, the tetraamide and the imide-diamide compounds. This requires from about 1 to about 8 hours. Normally, heating is continued until no more water is evolved from the reaction mixture.

Preferably the reaction is carried out in the presence of an inert solvent that boils above about 190° C. in order to remove by azeotropic distillation the water formed in the reaction. The EDTA is mixed with the solvent in the reaction vessel and the amine is then added. Suitable solvents include hydrocarbon fractions such as kerosene or Stoddard solvent that have end points substantially higher than about 190° C. By employing such a high boiling solvent, essentially complete dehydration is obtained in about 1–8 hours and the amine salt compounds are eliminated from the product or at least reduced to such a low level that the acid number is less than 60 and the imide-amide reaction product consists essentially of compounds containing no more than one salt group per molecule.

An especially preferred imide-amide reaction product is that made by heating a mixture of the commercial product Primene 81–R and EDTA, the mole ratio of the commercial product to EDTA being about 4:1, in kerosene solution at the boiling point of the solution, about 190–210° C., until a product acid number of about 50 is obtained. Time required for the reaction is about 1.5 hours. Under these conditions about 17–37% by weight of the EDTA carboxyl groups are converted to imides, about 40–60% by weight of the EDTA carboxyl groups are converted to amides and about 23% by weight of the EDTA carboxyl groups are in amine salt form.

Hydrogenated condensation products of long chain aliphatic amines and reducing sugars are readily made from the condensation products of long chain aliphatic amines and reducing sugars.

The condensation products of long chain aliphatic amines and reducing sugars are known compounds. They and their preparation are disclosed in detail in the U.S. Patents, No. 2,808,401 and No. 2,815,340, to Erickson, J. Am. Chem. Soc. 77, 2839 (1955), and in German Patent 1,079,381. Typical examples of a reducing sugar are lactose, glucose, maltose, cellobiose, mannose and the like with lactose and glucose being preferred.

Typical examples of a long chain aliphatic amine, an aliphatic amine having at least 8 carbon atoms, preferably at least 16 carbon atoms and usually at most about 22 carbon atoms although a larger number can be employed, are such primary amines as octylamine, dodecylamine, heptadecylamine, hexadecylamine, octadecylamine, octadedenylamine, octadecadienylamine, N-dodecyltrimethylenediamine, N-octadecyltrimethylenediamine, mixtures of these amines and of various other amines and mixtures of amines derived from natural fats such as tallow, soybean oil, coconut oil and the like. As far as this invention is concerned, the number of amine substituents in the condensation product molecule can vary. For example, in the case of the condensation product of a long chain aliphatic amine and glucose the number of amine substituents can vary from 1 to 5 with the preferred number of amine substituents being 1–2. In the case of the condensation product of a long chain aliphatic amine and lactose as well as in the case of the condensation product of a long chain aliphatic amine and maltose, the number of amine substituents in the condensation product molecule can vary from 1 to 3 with 2–3 being preferred.

Under the concepts of this invention it is necessary that the condensation products of long chain aliphatic amines and reducing sugars be hydrogenated. The non-hydrogenated condensation products generally are unstable under storage conditions and show very little activity in inhibiting sludging of hydrocarbon oils. On the other hand, the hydrogenated condensation products are stable under normal storage conditions and have antisludging activity in fuel oils and the like.

The hydrogenated condensation products are prepared from the condensation products by hydrogenating the condensation products either in isolated condition or in their condensation reaction mixtures. Hydrogenation of the condensation products is accomplished by adding hydrogen thereto at a temperature of 75–100° C. and a pressure of 200–2000 pounds per square inch and in the presence of a hydrogenation catalyst such as Raney nickel. When hydrogenation is complete, the catalyst is removed and the hydrogenated condensation product is preferably isolated and dried.

The weight ratio of the imide-amide reaction product to the hydrogenated condensation product in the antisludging composition of this invention is in a preferred range from about 9:1 to about 500:1. In the case of a preferred embodiment of the antisludging composition, which embodiment consists essentially of (1) the imide-reaction product such as the preferred product obtained by reacting EDTA and the commercial product Primene 81–R at a mole ratio of EDTA to the commercial product of about 1:4 and (2) the hydrogenated condensation product of lactose and octadecylamine, which hydrogenated condensation product predominates in a compound containing 3 amine substituents in its molecule, the weight ratio of the imide-amide reaction product to the hydrogenated condensation product is preferably about 19:1. While weight ratios lower than about 9:1 and higher than about 500:1 can be employed, a mole ratio less about 9:1 is not recommended when water is present or likely to be present at a substantial concentration in the hydrocarbon oil; large relative concentrations of the hydrogenated condensation product tends to promote emulsification of the water and hydrocarbon oil. This condition is generally to be avoided inasmuch as sludging tends to occur more readily when this condition is present.

A preferred embodiment of the antisludging composition of this invention is in the form of a solution. It consists essentially of a solvent carrier and dissolved therein the mixture of the imide-amide reaction product and the hydrogenated condensation product, the imide-amide reaction product and the hydrogenated condensation product being at a weight ratio in the preferred range. The solvent carrier is a solvent or blend or solvents, in which the mixture at practical concentrations is soluble and which results in a solution readily dissolved at use concentrations in hydrocarbon oil. The solvent carrier is normally inert relative to the mixture, hydrocarbon oil and materials of construction usually employed in storage tanks, pipe lines, etc. Hydrocarbon solvents in general meet these requirements. A typical and preferred example of such a solvent carrier is kerosene. In general, the mixture and the solvent carrier can vary in relative concentrations. Generally all that is required is that the solvent carrier concentration be sufficient to dissolve all of the mixture. Larger concentrations can be employed, however. A satisfactory concentration in the case of kerosene and a mixture consisting essentially of (1) the imide-amide reaction product such as the preferred product obtained by reacting EDTA and the commercial product Primene 81–R at a mole ratio of EDTA to the commercial product of about 1:4 and (2) the hydrogenated condensation product of lactose and octadecylamine, which hydrogenated condensation product predominates in a compound containing 3 amine substituents in its molecule, the weight ratio of the imide-amide reaction product to the hydrogenated condensation product being about 19:1, is about 50% by weight of kerosene. The solution is prepared by admixing the components preferably at a temperature at which the hydrogenated condensation product goes into solution fairly readily. A recommended temperature is 55–60° C.

The hydrocarbon oil of this invention contains the antisludging composition of this invention in solution at a concentration at least at which inhibition of sludging and discoloration is substantial. Such a concentration is an effective concentration. Any greater concentration in general depends upon the degree or extent of antisludging effect desired. This in turn depends upon the hydrocarbon oil involved as well as the storage conditions to which a particular hydrocarbon oil is to be subjected. Under most normally encountered conditions, a concentration of the antisludging mixture in a range from about 0.001 to about 0.05% by weight of the hydrocarbon oil gives satisfactory results. When the solution form of the antisludging composition is employed, particularly the 50% by weight kerosene embodiment, this is equivalent to a solution concentration in a range from about 0.002 to about 0.012% by weight of the hydrocarbon oil or from about 5 to about 30 pounds of solution per 1000 barrels of hydrocarbon oil.

The hydrocarbon oil composition of this invention is prepared merely by admixing the antisludging composition of this invention with the hydrocarbon oil to be stabilized relative to sludging and color formation. The antisludging composition of this invention in general, and particularly the solvent solution embodiment thereof is characterized by good solubility in organic solvents, particularly hydrocarbon solvents at the concentrations normally employed. Hence, upon admixture at 20° C. with a hydrocarbon oil, the solvent solution embodiment of the antisludging composition generally goes into solution readily.

This invention is further illustrated by the following examples of various aspects thereof, including specific embodiments of the invention. This invention is not limited to these specific embodiments unless otherwise indicated.

EXAMPLE 1

This example illustrates the synthesis of a preferred imide-amide reaction product.

195.0 grams (0.665 mole) of ethylenediamine tetraacetic acid, 534.0 grams (2.67 mole) of a commercial mixture of branched chain, primary alkyl amines with the amine groups being attached to tertiary carbon atoms, having 12–15 carbon atoms per molecule and an average molecular weight of about 200 (Primene 81–R) and 564.0 grams of kerosene are charged to a 3 liter, 3 neck, round bottom flask. The mixture of reaction is heated to 190–210° C. and maintained at this temperature with stirring for 1 hour and 40 minutes. During this period of time water distills off from the reaction mixture, a typical quantity of water so distilled being 33.5 grams. The imide-amide reaction product thus obtained typically weighs 1258 grams and typically contains 44.8% by weight of kerosene and 55.2% by weight of the desired imide-amide reaction product.

EXAMPLE 2

This example illustrates the synthesis of a preferred hydrogenated condensation product of lactose and octadecylamine.

270 grams (1 mole) of octadecylamine and 1540 grams of methanol are charged to a 3 liter, 3 neck, round bottom flask. The charge is heated to 63° C. with stirring to dissolve the octadecylamine. 90 grams (0.25 mole) of lactose are added in two minutes to the solution of methanol and octadecylamine, and the resulting batch is refluxed three and one-half hours. The result is a reaction mixture containing a condensation product of lactose and octadecylamine, which product predominates in a compound having 3 octadecylamine substituents in its molecule.

The warm reaction mixture, which must be at least at 50° C. to prevent precipitation of solids, is transferred to an autoclave. 100 grams of methanol are employed to wash residual reaction mixture from the flask and the wash liquid thus obtained is added to the autoclave. 45 grams of Raney nickel, wet with methanol, are also charged to the autoclave. The autoclave is then closed and hydrogen is introduced therein into the reaction mixture for two hours at a temperature of 75° C. and at a pressure of 1000–1100 pounds per square inch. The hydrogenated reaction mixture thus obtained is removed from the autoclave and filtered at 55–60° C. to remove the catalyst. The filtrate is cooled to 10° C. and filtered again. The filter cake thus obtained is air dried, giving thereby a hydrogenated condensation product of lactose and octadecylamine, which product predominates in a compound having 3 octadecylamine substituents in its molecule. A typical yield under these conditions of the hydrogenated condensation product is 234 grams, representing a yield of 86% by weight based on the lactose. Distillation of the filtrate typically gives 90 grams (0.3 mole) of unreacted octadecylamine, which indicates that 180 grams (0.7 mole) of octadecylamine reacted with the lactose.

EXAMPLE 3

This example illustrates the preparation of a specific embodiment of the solution form of the antisludging composition of this invention.

86 grams of the reaction mixture of Example 1 (a solution of 55.2% by weight of imide-amide reaction mixture and 44.8% by weight of kerosene) 2.5 grams of the hydrogenated condensation product of Example 2 and 11.5 grams of kerosene are charged to a container. The charge is heated to 55–60° C. with stirring until the hydrogenated condensation product is dissolved. A solution results. Thus, there is obtained an antisludging composition in the form of a solution containing 50% by weight of kerosene, 47.5% by weight of imide-amide reaction product and 2.5% by weight of hydrogenated condensation.

EXAMPLE 4

This example illustrates a specific fuel oil embodiment of the hydrocarbon oil of this invention.

The formulation of this specific fuel oil embodiment is:

| Components— | Concentration |
| --- | --- |
| Commercial No. 2 fuel oil _____barrels__ | 1000 |
| Antisludging composition (solution form) of Example 3 _____pounds__ | 10 |

The specific hydrocarbon oil composition of this fuel oil formulation is prepared merely by adding the antisludging composition to the fuel oil at room temperature (20° C.) and stirring until the antisludging composition is uniformly blended into the fuel oil.

The effectiveness of the antisludging composition of this invention is demonstrated by the following test data obtained in actual tests made in a testing program involving various fuel oils including fuel oils containing the antisludging solution of Example 3. The tests employed are described as follows.

C.S. ACCELERATED, FUEL OIL STABILITY TEST

This test measures the ability of a hydrocarbon oil to withstand severe oxidizing conditions.

A 350 milliliter sample of the hydrocarbon oil under test is filtered through a filter pad.

The quantity of residue or sludge left on the pad is judged visually by comparing the pad to a graded series of standard filter pads ranging in shade from white to black and rated from 0 to 10 with 0 being a white pad and 10 being a black pad.

The color of the filtrate is also determined by means of a Saybolt chromometer (ASTM D156-53T) or a Union colorimeter (ASTM D155-45T).

Another 350 milliliter sample of the hydrocarbon oil under test is heated to 180° F. and maintained at this temperature for either 96 hours (equivalent to 72 weeks outside drum storage) or 192 hours while injecting 10 liters of air per hour into the sample by means of a sparger tube. The sample thus aged is thereafter filtered through a clean filter pad. The quantity of sludge left on the pad and the color of the filtrate are then measured as before.

110° F. STORAGE TEST

This test is likewise an accelerated, hydrocarbon oil stability test.

A 100 milliliter sample of the oil to be tested is filtered through a tared gouch crucible adapted from ASTM D873-57T. The weight of the residue or sludge in the crucible is then determined and recorded as milligrams of sludge per 100 milliliters of hydrocarbon oil. In addition, the color of the filtrate is determined by means of a Saybolt chromometer (ASTM D156-53T) or a Union colorimeter (ASTM D155-45T).

The hydrocarbon oil to be tested is placed in a bottle with a notched cork to afford access of the oil therein to air. The bottle is then aged at 110° F. for 16 weeks which is approximately equivalent to 64 weeks outside storage of the oil in drums. At the end of this period of time a 100 milliliter aliquot portion of the aged hydrocarbon oil is filtered through a tared gouch crucible of the foregoing type. The weight of the sludge in the crucible is determined and recorded as milligrams of sludge per 100 milliliters of hydrocarbon oil. Color of the filtrate is also determined by means of one of the aforementioned instruments.

WATER TOLERANCE TEST

Some compositions upon being incorporated into hydrocarbon oils have a tendency to promote emulsification when water is present. This is undesirable as emulsification appears to promote sludge formation. Hence, an antisludging composition in hydrocarbon oils should either prevent or hold water-oil emulsification to a minimum.

An 80 milliliter sample of the hydrocarbon oil to be tested is placed in a 35 mm. x 300 mm. test tube and 20 milliliters of tap water are added to the tube. The sample is agitated vigorously for 2 minutes and allowed to settle undisturbed for 5 minutes. Then, the condition of the water layer at the hydrocarbon oil-water interface is noted along with any volume change. The oil-water interface is given a numerical rating of 1–4 depending on the degree of emulsification. The lower the number the less emulsification observed. This test is an adaptation of Federal Test Method Standard No. 791, Method 3251.6 (October 28, 1957).

In the testing program commercial, No. 2 fuel oils from five different sources were employed. These fuel oils are identified herein as to source as A, B, C, D and E. As already mentioned, one of the additives was the antisludging solution of Example 3. It is identified in the following tables as Ex. 3 Solution. Another additive employed was a widely used commercial available, antisludging solution identified in the following tables as Comm. Solution, containing at about a 50% by weight concentration an antisludging composition consisting essentially of a nitrogen containing methacrylate polymer. In the following tables the minus sign (−) where used means that the actual value was slightly less than that given while the plus sign (+) where used indicates that the reported actual value was slightly greater than that given.

In the first series of tests in this testing program commercial, No. 2 fuel oil A was employed. Samples of the oil with and without additives were subjected to the C.S. Accelerated, Fuel Oil Stability Test. Aging time for each sample was 96 hours. The test results and other test conditions are summarized in the following Table I.

*Table I*

| Sample No. | Antisludging additive | Additive concentration (pounds per 1,000 barrels) | Filter pad, initial | Rating, final | Filtrate color (Union Colorimeter) | |
|---|---|---|---|---|---|---|
| | | | | | Initial | Final |
| 1 | None | | 5 | 5 | 1½− | 3− |
| 2 | Ex. 3 solution | 10 | 5 | 3.5 | 1½− | 2½ |
| 3 | Comm. solution | 10 | 5 | 3 | 1½− | 3 |
| 4 | Ex. 3 solution | 20 | 5 | 3 | 1½− | 2½ |
| 5 | Comm. solution | 20 | 5 | 3.5 | 1½− | 3− |

These data show that the antisludging composition of this invention is as effective as the commercial additive in inhibiting sludging of the particular fuel oil and more effective than the commercial additive in inhibiting discoloration of this fuel oil.

In the second reported series of tests a commercial, No. 2 fuel oil B was employed. Samples of the oil with and without additives were subjected to the C.S. Accelerated, Fuel Oil Stability Test with the aging time being 192 hours. The test results and other test conditions are set out in the following Table II.

*Table II*

| Sample No. | Antisludging additive | Additive concentration (pounds per 1,000 barrels) | Filter pad, initial | Rating, final | Filtrate color (Union Colorimeter) | |
|---|---|---|---|---|---|---|
| | | | | | Initial | Final |
| 1 | None | | 1 | 6 | 1 | 2½− |
| 2 | Ex. 3 solution | 10 | 1 | 1.5 | 1 | 1½− |
| 3 | Comm. solution | 10 | 1 | 3 | 1 | 2½− |
| 4 | Ex. 3 solution | 20 | 1 | 1 | 1 | 1½− |
| 5 | Comm. solution | 20 | 1 | 2.5 | 1 | 2½− |

These data show that the antisludging composition of this invention is more effective than the commercial additive in inhibiting sludging as well as discoloration of this particular fuel oil.

In the third reported series of tests a commercial, No. 2 fuel oil C was employed. Samples of the oil, with and without additives were put through the C.S. Accelerated, Fuel Oil Stability Test with the aging time being 96 hours. The test results and other test conditions are tabulated in the following Table III.

*Table III*

| Sample No. | Antisludging additive | Additive concentration (pounds per 1,000 barrels) | Filter pad, initial | Rating, final | Filtrate color (Union Colorimeter) | |
|---|---|---|---|---|---|---|
| | | | | | Initial | Final |
| 1 | None | | 2.5 | 7 | 2½ | 4— |
| 2 | Ex. 3 solution | 10 | 2.5 | 4 | 2½ | 4— |
| 3 | Comm. solution | 10 | 2.5 | 4.5 | 2½ | 4— |
| 4 | Ex. 3 solution | 20 | 2.5 | 3 | 2½ | 4— |
| 5 | Comm. solution | 20 | 2.5 | 6 | 2½ | 4½— |

The data developed in this series of tests, as shown in Table III, demonstrate that the antisludging composition of this invention is more effective than the heretofore commercially available antisludging composition in inhibiting and discoloration of fuel oil C.

In the fourth series of tests, a commercial, No. 2 fuel oil D was employed. Samples of the oil, with and without antisludging additives, but containing 1 part per million of copper in the form of copper oleate, were subjected to the C.S. Accelerated, Fuel Oil Stability Test with the aging time being 96 hours. The test results and other test conditions are set forth in the following Table IV.

*Table IV*

| Sample No. | Antisludging additive | Additive concentration (pounds per 1,000 barrels) | Filter pad, initial | Rating, final | Filtrate (Saybolt Chromometer) Initial | Color (Union Colorimeter) Final |
|---|---|---|---|---|---|---|
| 1 | None | | 2 | 7 | +8 | 4½— |
| 2 | Ex. 3 solution | 10 | 2 | 6 | +8 | 4½— |
| 3 | Comm. solution | 10 | 2 | | +8 | 4½— |
| 4 | Hydrogenated condensation Prod. of Ex. 2. | 10 | 2 | 8 | +8 | 4½— |
| 5 | Ex. 3 solution | 20 | 2 | 4 | +8 | 4½— |
| 6 | Comm. solution | 20 | 2 | 8 | +8 | 4½— |
| 7 | Hydrogenated condensation Prod. of Ex. 2. | 20 | 2 | 7 | +8 | 4½ |

These data demonstrate that the antisludging solution of this invention is more effective than the commercial solution and the hydrogenated condensation product of Example 2 in inhibiting sludging of fuel oil D.

In the fifth series of tests, commercial, No. 2 fuel oils A, C and E were employed. Samples of these oils, with and without antisludging additives, were subjected to the 110° F. Storage Test. The test results and other test conditions are summarized in the following Table V.

*Table V*

| Sample No. | Fuel oil | additive | Additive concentration (pounds per 1,000 barrels) | Filter pad, initial | Rating, final | Filtrate Color (Union Colorimeter) | |
|---|---|---|---|---|---|---|---|
| | | | | | | Initial | Final |
| 1 | A | None | | 1.0 | 1.5 | 1½ | 3½— |
| 2 | A | Ex. 3 Solution | 5 | 1.0 | 1.0 | 1½ | 3 |
| 3 | A | Comm. Solution | 5 | 1.0 | 2.3 | 1½ | 3 |
| 4 | A | Ex. Solution | 10 | 1.0 | 1.0 | 1½ | 3 |
| 5 | A | Comm. Solution | 10 | 1.0 | 1.4 | 1½ | 3½— |
| 6 | C | None | | 1.9 | 7.8 | 2½— | 5— |
| 7 | C | Ex. 3 Solution | 5 | 1.9 | 3.4 | 2½— | 5— |
| 8 | C | Comm. Solution | 5 | 1.9 | 8.3 | 2½— | 5— |
| 9 | C | Ex. 3 Solution | 10 | 1.9 | 4.1 | 2½— | 4½ |
| 10 | C | Comm. Solution | 10 | 1.9 | 10.6 | 2½— | 5— |
| 11 | E | None | | 0.2 | 3.2 | 1½— | 3½— |
| 12 | E | Ex. 3 Solution | 5 | 0.2 | 2.4 | 1½— | 3½— |
| 13 | E | Comm. Solution | 5 | 0.2 | 2.9 | 1½— | 3½— |
| 14 | E | Ex. 3 Solution | 10 | 0.2 | 2.1 | 1½— | 3½— |
| 15 | E | Comm. Solution | 10 | 0.2 | 1.4 | 1½— | 3½— |

These data show that the antisludging solution of this invention is more effective than the heretofore available commercial antisludging solution in inhibiting sludging and discoloration of these fuel oils.

In the sixth series of tests, commercial, No. 2 fuel oils B and D were employed. Samples of these hydrocarbon oils with and without antisludging additives, but containing 1 part per million of copper in the form of copper oleate, were given the 110° F. Storage Test.

The test results and other test conditions are indicated by the following Table VI.

*Table VI*

| Sample No. | Fuel oil | Antisludging additive | Additive concentration (pounds per 1,000 barrels) | Filter pad, initial | Rating, final | Filtrate Color (Union Colorimeter) | |
|---|---|---|---|---|---|---|---|
| | | | | | | Initial | Final |
| 1 | B | None | | 0.2 | 4.5 | 1½– | 2 |
| 2 | B | Ex. 3 Solution | 5 | 0.2 | 1.7 | 1½– | 2 |
| 3 | B | Comm. Solution | 5 | 0.2 | 7.9 | 1½– | 2 |
| 4 | B | Ex. 3 Solution | 10 | 0.2 | 1.6 | 1½– | 2 |
| 5 | B | Comm. Solution | 10 | 0.2 | 1.7 | 1½– | 2½– |
| 6 | D | None | | 0.2 | 0.7 | 1– | 1 |
| 7 | D | Ex. 3 Solution | 5 | 0.2 | 0.5 | 1– | 1 |
| 8 | D | Comm. Solution | 5 | 0.2 | 0.8 | 1– | 1 |
| 9 | D | Ex. 3 Solution | 10 | 0.2 | 0.7 | 1– | 1 |
| 10 | D | Comm. Solution | 10 | 0.2 | 1.0 | 1– | 1 |

These data demonstrate that the antisludging composition of this invention at the concentrations indicated are effective in inhibiting sludging of fuel oils B and D even in the presence of soluble copper. Moreover, these data indicate that the antisludging composition is more effective than the commercial solution at comparable concentrations in inhibiting sludging of fuel oils B and D.

The seventh series of tests involved commercial, No. 2 fuel oil C. Samples of this oil, with and without additives, were given the Water Tolerance Test. Results of this testing and test conditions are summarized in the following Table VII.

*Table VII*

| Sample No. | Antisludging additive | Additive concentration (pounds per 1,000 barrels) | Oil-water interface appearance | Rating |
|---|---|---|---|---|
| 1 | None | | Trace of scum | 2 |
| 2 | Ex. 3 solution | 10 | Clear | 1b |
| 3 | Comm. solution | 10 | Severe Emulsification | 3 |
| 4 | Hydrogenated condensation product of Ex. 2. | 10 | Severe Emulsification | 3 |
| 5 | Ex. 3 solution | 20 | Clear | 1b |
| 6 | Comm. solution | 20 | Severe Emulsification | 4 |
| 7 | Hydrogenated condensation product of Ex. 2. | 20 | Severe Emulsification | 4 |
| 8 | Ex. 3 solution | 30 | Slight Emulsification | 2 |
| 9 | Comm. solution | 30 | Severe Emulsification | 4 |
| 10 | Hydrogenated condensation product of Ex. 2. | 30 | Severe Emulsification | 4 |

These data show that the antisludging composition of this invention at the concentrations indicated does not give rise to severe emulsification of oil and water. On the other hand, the commercial antisludging composition and the hydrogenated condensation product of Example 2 tend to promote severe emulsification of oil and water.

The data obtained in this testing program and reported in the foregoing tables dramatically illustrate the outstanding effectiveness of the antisludging composition of this invention. These data also demonstrate that the hydrogenated condensation product of lactose and octadecylamine has merit as a fuel oil additive and is effective in inhibiting sludging. However, these data also show that such a product by itself as an antisludging additive is adversely affected by the presence of water and soluble copper in the fuel oil.

Thus, there is provided an antisludging composition for hydrocarbon oils and the like, which is capable of giving to hydrocarbon oils a high degree of protection relative to sludging and color formation.

Other features, advantages and embodiments of this invention will be readily apparent to those in the exercise of ordinary skill in the art after reading the foregoing disclosure. In this regard, while this invention has been described in considerable detail relative to specific embodiments thereof, variations and modifications of these embodiments can be effected within the spirit and scope of the invention as described and claimed.

The embodiments of the invention in which an exclusive property or privilege is claimed are defined as follows:

1. A composition consisting essentially of the mixture of (1) an imide-amide reaction product obtained by reacting ethylenediamine tetraacetic acid with an aliphatic primary amine having 4–24 carbon atoms per molecule at a mole ratio of amine to acid of at least about 2:1 and at a temperature of at least about 190° C., said reaction product having an average content of amine salt groups and carboxyl groups of at most one of such groups per molecule of reaction product, and (2) a hydrogenated condensation product of a reducing sugar and a long chain aliphatic amine, the weight ratio of the imide-amide reaction product to the hydrogenated condensation product being in a range from about 9:1 to about 500:1.

2. A composition consisting essentially of the mixture of (1) an imide-amide reaction product obtained by reacting ethylenediamine tetraacetic acid with a $C_{12}$–$C_{15}$ aliphatic primary amine having the amine group attached to a tertiary carbon atom and having an average molecular weight of about 200, at a mole ratio of amine to acid of about 4:1 and at a temperature in a range from about 190–220° C., said reaction product having an average content of amine salt groups and carboxyl groups of at most one of such groups per molecule of reaction product, and (2) the hydrogenated condensation product of lactose and octadecylamine said product predominating in a compound having about three amine substituents in the molecule thereof, the weight ratio of said imide-amide reaction product to the hydrogenated condensation product being in a range from about 9:1 to about 500:1.

3. A composition according to claim 2 wherein the weight ratio of said imide-amide reaction product to hydrogenated condensation product is about 19:1.

4. A composition consisting essentially of a solution of (A) the mixture of (1) an imide-amide reaction product obtained by reacting ethylenediamine tetraacetic acid with an aliphatic primary amine having 4–24 carbon atoms per molecule at a mole ratio of amine to acid of at least about 2:1 and at a temperature of at least about 190° C., said reaction product having an average content of amine salt groups and carboxyl groups of at most one of such groups per molecule of reaction product, and (2) a hydrogenated condensation product of a reducing sugar and a long chain aliphatic amine, the weight ratio of the imide-amide reaction product to the hydrogenated condensation product being in a range from about 9:1 to about 500:1 and, (B) an inert solvent for said mixture.

5. A composition consisting essentially of a solution of (A) the mixture of (1) an imide-amide reaction product obtained by reacting ethylenediamine tetraacetic acid with a $C_{12}-C_{15}$ alkyl primary amine having the amine group attached to a tertiary carbon atom and having an average molecular weight of about 200, at a mole ratio of amine to acid of about 4:1 and at a temperature in a range from about 190–220° C., said reaction product having an average content of amine salt groups and carboxyl groups of at most one of such groups per molecule of reaction product, and (2) the hydrogenated condensation product of lactose and octadecylamine said product predominating in a compound having about three amine substituents in the molecule thereof, the weight ratio of said imide-amide reaction product to the hydrogenated condensation product being in a range from about 9:1 to about 500:1, and (B) an insert solvent for said mixture.

6. A composition consisting essentially of a solution of (A) the mixture of (1) an imide-amide reaction product obtained by reacting ethylenediamine tetraacetic acid with a $C_{12}-C_{15}$ alkyl primary amine having the amine group attached to a tertiary carbon atom and having an average molecular weight of about 200, at a mole ratio of amine to acid of about 4:1 and at a temperature in a range from about 190°–220° C., said reaction product having an average content of amine salt groups and carboxyl groups of at most one of such groups per molecule of reaction product, and (2) the hydrogenated condensation product of lactose and octadecylamine said product predominating in a compound having about three amine substituents in the molecule thereof, the weight ratio of said imide-amide reaction product to the hydrogenated condensation product being about 19:1, and (B) kerosene.

7. A composition according to claim 6 wherein the concentration of said mixture is about 50% by weight of said solution.

8. A sludging inhibited hydrocarbon oil containing at an effective concentration an antisludging composition that consists essentially of (1) an imide-amide reaction product obtained by reacting ethylenediamine tetraacetic acid with a aliphatic primary amine having 4–24 carbon atoms per molecule at a mole ratio of amine to acid of at least about 2:1 and at a temperature of at least about 190° C., said reaction product having an average content of amine salt groups and carboxyl groups of at most one of such groups per molecule of reaction product, and (2) a hydrogenated condensation product of a reducing sugar and a long chain aliphatic amine, the weight ratio of the imide-amide reaction product to the hydrogenated condensation product being a range from about 9:1 to about 500:1.

9. A sludging inhibited hydrocarbon oil containing at an effective concentration an antisludging composition that consists essentially of (1) an imide-amide reaction product obtained by reacting ethylenediamine tetraacetic acid with a $C_{12}-C_{15}$ aliphatic primary amine having the amine group attached to a tertiary carbon atom and having an average molecular weight of about 200, at a mole ratio of amine to acid of about 4:1 and at a temperature in a range from about 190°–220° C., said reaction product having an average content of amine salt groups and carboxyl groups of at most one of such groups per molecule of reaction product, and (2) the hydrogenated condensation product of lactose and octa-decylamine said product predominating in a compound having about three amine substituents in the molecule thereof, the weight ratio of said imide-amide reaction product to the hydrogenated condensation product being in a range from about 9:1 to about 500:1.

10. A hydrocarbon oil containing at a concentration in a range from about 0.001 to about 0.06% by weight of the hydrocarbon oil an antisludging composition that consists essentially of (1) an imide-amide reaction product obtained by reacting ethylenediamine tetraacetic acid with a $C_{12}-C_{15}$ aliphatic primary amine having the amine group attached to a tertiary carbon atom and having an average molecular weight of about 200, at a mole ratio of amine to acid of about 4:1 and at a temperature in a range from about 190–220° C., said reaction product having an average content of amine salt groups and carboxyl groups of at most one of such groups per molecule of reaction product, and (2) the hydrogenated condensation product of lactose and octadecylamine said product predominating in a compound having about three amine substituents in the molecule thereof, the weight ratio of said imide-amide reaction product to the hydrogenated condensation product being in a range from about 9:1 to about 500:1.

11. A hydrocarbon oil containing at a concentration in a range from about 0.002 to about 0.012% by weight of the oil an antisludging additive which consists essentially of a solution of (A) the mixture of (1) an imide-amide reaction product obtained by reacting ethylenediamine tetraacetic acid with a $C_{12}-C_{15}$ alkyl primary amine having the amine group attached to a tertiary carbon atom and having an average molecular weight of about 200, at a mole ratio of amine to acid of about 4:1 and at a temperature in a range from about 190–220° C., said reaction product having an average content of amine salt groups and carboxyl groups of at most one of such groups per molecule of reaction product, and (2) the hydrogenated condensation product of lactose and octadecylamine said product predominating in a compound having about three amine substituents in the molecule thereof, the weight ratio of said imide-amide reaction product to the hydrogenated condensation product being in a range from about 9:1 to about 500:1, and (B) an inert solvent for said mixture.

12. A hydrocarbon oil containing at a concentration in a range from about 0.002 to about 0.012% by weight of the oil an antisludging additive which consists essentially of a solution of (A) the mixture of (1) an imide-amide reaction product obtained by reacting ethylenediamine tetraacetic acid with a $C_{12}-C_{15}$ alkyl primary amine having the amine group attached to a tertiary carbon atom and having an average molecular weight of about 200, at a mole ratio of amine to acid of about 4:1 and at a temperature in a range from about 190–220° C., said reaction product having an average content of amine salt groups and carboxyl groups of at most one of such groups per molecule of reaction product, and (2) the hydogenated condensation product of lactose and octadecylamine said product predominating in a compound having about three amine substituents in the molecule thereof, the weight ratio of said imide-amide reaction product to the hydrogenated condensation product being about 19:1, and (B) kerosene, the concentration of said mixture being about 50% by weight of said solution.

References Cited by the Examiner

UNITED STATES PATENTS

| 2,181,929 | 12/39 | Werntz | 260—211 |
|---|---|---|---|
| 2,805,203 | 9/57 | Knapp et al. | 44—63 |
| 2,954,342 | 9/60 | Hotten | 252—403 |
| 3,018,173 | 1/62 | Cyba | 44—72 |

DANIEL E. WYMAN, *Primary Examiner.*